US012800538B2

(12) United States Patent
Berduque et al.

(10) Patent No.: US 12,800,538 B2
(45) Date of Patent: Nov. 17, 2026

(54) REFERENCE ELECTRODE

(71) Applicant: Analog Devices International Unlimited Company, Limerick (IE)

(72) Inventors: Alfonso Berduque, Crusheen (IE); Nakkiran Arulmozhi, Limerick (IE); Louise McGrath, Cork (IE); Richard Doyle, Churchtown (IE)

(73) Assignee: Analog Devices International Unlimited Company, County Limerick (IE)

( * ) Notice: Subject to any disclaimer, the term of this patent is extended or adjusted under 35 U.S.C. 154(b) by 219 days.

(21) Appl. No.: 18/746,929

(22) Filed: Jun. 18, 2024

(65) Prior Publication Data

US 2024/0418667 A1 Dec. 19, 2024

Related U.S. Application Data

(60) Provisional application No. 63/508,993, filed on Jun. 19, 2023.

(51) Int. Cl.
*G01N 27/30* (2006.01)
*G01N 27/416* (2006.01)

(52) U.S. Cl.
CPC ....... *G01N 27/301* (2013.01); *G01N 27/4163* (2013.01)

(58) Field of Classification Search
None
See application file for complete search history.

(56) References Cited

U.S. PATENT DOCUMENTS 7,384,523 B2 6/2008 Samproni
2004/0188252 A1* 9/2004 Chan .................... G01N 27/301 204/435
2016/0178572 A1* 6/2016 Zevenbergen ....... G01N 27/333 205/789
2019/0376927 A1 12/2019 Gahlings et al.
2021/0215637 A1 7/2021 Gahlings et al.
2021/0223197 A1 7/2021 Lawrence

FOREIGN PATENT DOCUMENTS

GB 2539224 A 12/2016
JP 2001108652 * 4/2011 ........... G01N 33/182
WO WO 2023/180349 A1 9/2023

OTHER PUBLICATIONS

Extended European Search Report in European Patent Application No. 24182499.4, dated Nov. 29, 2024.

(Continued)

*Primary Examiner* — J. Christopher Ball
(74) *Attorney, Agent, or Firm* — Knobbe, Martens, Olson & Bear, LLP

(57) ABSTRACT

Systems and methods for reference electrodes are disclosed. In one aspect, a measurement system includes a pseudo-reference electrode configured to provide a reference potential and a dependence electrode configured to generate a dependence potential when exposed to a sample. Both the reference potential and the dependence potential vary based on a property of the sample. An electrochemical sensor includes the pseudo-reference electrode and the dependence electrode.

19 Claims, 4 Drawing Sheets

(56) References Cited

OTHER PUBLICATIONS

Bratov, Andrey, Natalia Abramova, and Carlos Domínguez. "Investigation of chloride sensitive ISFETs with different membrane compositions suitable for medical applications." *Analytica Chimica Acta* 514.1 (2004): 99-106.

Chen, Xin V., Andreas Stein, and Philippe Bühlmann. "Reference electrodes based on ionic liquid-doped reference membranes with biocompatible silicone matrixes." *ACS sensors* 5.6 (2020): 1717-1725.

Gao, Wenyue, et al. "A solid-state reference electrode based on a self-referencing pulstrode." *Angewandte Chemie International Edition* 59.6 (2020): 2294-2298.

Kojima, Junko, Kenichi Uchiyama, and Yumi Yoshida. "Application of a novel ionic-liquid-based membrane reference electrode with inorganic insertion material paste to a calibration-free all-solid-state ion sensor chip." *Sensors and Actuators B: Chemical* 347 (2021): 130625.

Lewenstam, Andrzej, Teresa Blaz, and Jan Migdalski. "All-Solid-State Reference Electrode with Heterogeneous Membrane." *Analytical chemistry* 89.2 (2017): 1068-1072.

Overview of Reference Electrodes and Alternative Reference Electrodes; Document No. DRK10053 (REV001 I Apr. 2016) 11 pages.

* cited by examiner

REFERENCE ELECTRODE

CROSS-REFERENCE TO RELATED APPLICATION(S)

Any and all applications for which a foreign or domestic priority claim is identified in the Application Data Sheet as filed with the present application are hereby incorporated by reference under 37 CFR 1.57.

This application claims the benefit of priority of U.S. Provisional Application No. 63/508,993, filed Jun. 19, 2023, the entire disclosure of which is incorporated herein by reference in its entirety and for all purposes.

BACKGROUND

Field

The present disclosure relates generally to electrochemical sensors and, in particular, to reference electrodes of electrochemical sensors.

Description of the Related Technology

Electrochemical sensors are a class of chemical sensors in which an electrode is used as a transducer element in the presence of an analyte. An electrochemical sensor may convert information associated with electrochemical reactions (e.g., the reaction between an electrode and an analyte) into an applicable qualitative or quantitative signal. Electrochemical sensors can produce electronic outputs in digital signals for further analysis. Reference electrodes are used in measurement systems, such as electrochemical sensors, to measure parameters of a solution. The accuracy of a measurement system can depend in part on the consistency and stability of the potential of the reference electrode.

SUMMARY OF THE DISCLOSURE

The methods and devices of the described technology each have several aspects, no single one of which is solely responsible for its desirable attributes.

In one aspect, there is provided a measurement system, including: a pseudo-reference electrode configured to provide a reference potential; and a dependence electrode configured to generate a dependence potential when exposed to a sample, wherein both the reference potential and the dependence potential vary based on a property of the sample, and wherein an electrochemical sensor includes the pseudo-reference electrode and the dependence electrode.

In some embodiments, the measurement system further includes a processing circuit configured to compensate for a dependency in the reference potential based on the dependence potential.

In some embodiments, the processing circuit is further configured to control a bias potential between a working electrode and the pseudo-reference electrode.

In some embodiments, the measurement system further includes a counter electrode; and at least one working electrode, wherein the measurement system is configured to measure a parameter of the sample based on at least one of (i) a measurement potential between the working electrode and the pseudo-reference electrode, (ii) a current measurement between the working electrode and the counter electrode, (iii) a charge measurement between the working electrode and the counter electrode, or (iv) an impedance measurement between the working electrode and the counter electrode.

In some embodiments, the at least one working electrode includes a plurality of working electrodes, and wherein the plurality of working electrodes, the counter electrode, the pseudo-reference electrode, and the dependence electrode are arranged in-line.

In some embodiments, the pseudo-reference electrode has a chloride ion dependence, and wherein the dependence electrode is sensitive to chloride ions.

In some embodiments, the pseudo-reference electrode has a dependence on one or more of the following: chloride ions, bromine ions, iodine ions, bicarbonate ions, acetate ions, lactate ions, sulfate ions, nitrate ions, potassium ion, sodium ions, temperature, or pH.

In some embodiments, the pseudo-reference electrode includes one or more of: Ag, Au, AgCl, Pt, C, and/or AgBr.

In some embodiments, the measurement system further includes a membrane formed over the pseudo-reference electrode.

In some embodiments, the membrane is a chloride-diffusion restriction membrane, wherein the dependence sensor is a chloride electrode, and wherein the property is chloride concentration.

In some embodiments, the measurement system further includes a membrane formed over the dependence electrode.

In some embodiments, the pseudo-reference electrode is stored in a calibration solution.

In some embodiments, the dependence electrode is stored in the calibration solution.

In some embodiments, the measurement system further includes a second dependence electrode configured to generate a second dependence potential when exposed to the sample, wherein both the reference potential and the second dependence potential vary based on a second property of the sample.

In another aspect, there is provided a measurement method, including: obtaining a measurement from a dependence electrode that is exposed to a sample; and compensating for a dependency in a reference potential generated by a pseudo-reference electrode based on the measurement, wherein an electrochemical sensor includes the dependence electrode and the pseudo-reference electrode.

In some embodiments, the method further includes generating a measurement of a property of the sample based at least partly on a compensated reference potential generated by the compensating.

In some embodiments, the method further includes measuring a parameter of the sample based on at least one of (i) a measurement potential between a working electrode and the pseudo-reference electrode, (ii) a current measurement between the working electrode and a counter electrode, (iii) a charge measurement between the working electrode and the counter electrode, or (iv) an impedance measurement between the working electrode and the counter electrode.

In some embodiments, the method further includes obtaining a second measurement from a second dependence electrode that is exposed to the sample; and compensating for a second dependency in the reference potential generated by the pseudo-reference electrode based on the second measurement.

In yet another aspect, there is provided a measurement system including: means for providing a reference potential; and means for generating a dependence potential when exposed to a sample, wherein both the reference potential and the dependence potential vary based on a property of the sample, and wherein an electrochemical sensor includes the means for providing the reference potential and the means for generating the dependence potential.

In some embodiments, the measurement system further includes means for compensating for a dependency in the reference potential based on the dependence potential.

DETAILED DESCRIPTION OF CERTAIN EMBODIMENTS

Figure 1:
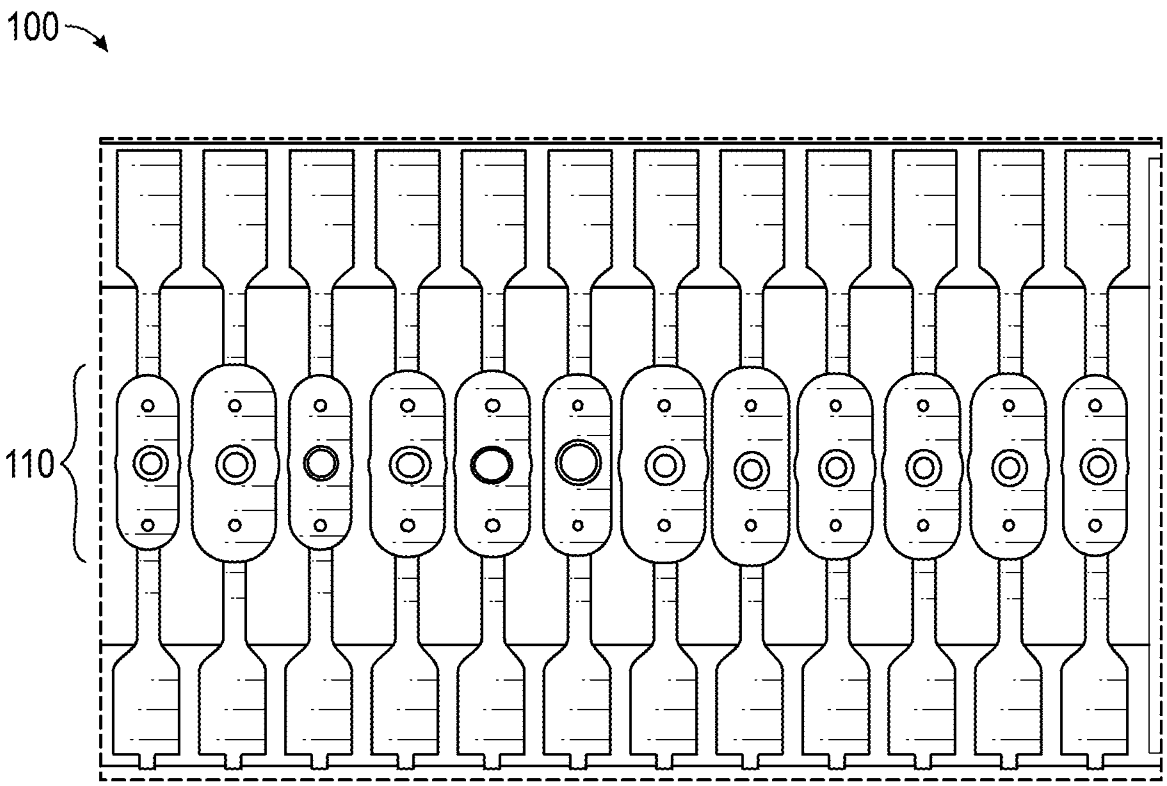
FIG. 1 shows an example in-line measurement system having a plurality of electrodes configured to measure a plurality of parameters in accordance with aspects of this disclosure.

The following detailed description of certain embodiments presents various descriptions of specific embodiments. However, the innovations described herein can be embodied in a multitude of different ways, for example, as defined and covered by the claims. In this description, reference is made to the drawings where like reference numerals and/or terms can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

Measurement systems can include a working electrode and a counter electrode configured to measure a particular parameter between the working and counter electrodes. Such measurement systems typically also include a reference electrode configured to provide a constant and stable defined potential or voltage. In particular, the reference electrode can help in biasing the working electrode in order to provide stability and consistency to measurements taken between the working electrode and the counter electrode. Thus, the reference electrode can provide a stable, well-defined reference voltage against which any variations in the measurements taken from the working electrode and the counter electrode can be compared. This enables the measurement system to correct for any variations in the voltages at the working electrode that may occur due to factors other than the desired parameter measurement. Accordingly, the use of a reference electrode in such measurement systems can improve the accuracy of measurements made using the working electrode. An electrochemical sensor can include one or more working electrodes, a reference electrode, and/or one or more counter electrodes. The electrochemical sensor can generate a measurement of a property of a solution, such as the concentration of certain ions in a fluid. In certain embodiments, the electrochemical sensor can include one or more working electrodes and a reference electrode without using any counter electrodes. These embodiments may be used, for example, for potentiometric sensors in which the sensor response is based on a voltage measurement between a working electrode and a reference electrode.

Traditional reference electrodes are relatively large and expensive due to the tolerances involved in designing the reference electrode that can ensure the accuracy of measurements taken by the above-described measurement systems. However, for many applications it can be desirable to provide a smaller measurement system and/or provide a plurality of working electrodes, which can measure a plurality of different parameters. Moreover, in some applications, the costs of commercial reference electrodes, or more 'bulky' reference electrodes, may be prohibitive. Such different parameters can be measured simultaneously. FIG. 1 shows an example in-line measurement system 100 having a plurality of electrodes configured to measure a plurality of parameters in accordance with aspects of this disclosure.

As shown in FIG. 1, the in-line measurement system 100 includes a plurality of electrodes 110 arranged in a line. In some implementations, a fluid (e.g., solution) being measured may be controlled to flow across the electrodes 110. Depending on the embodiment, the electrodes 110 of the in-line measurement system 100 can include at least one reference electrode and a plurality of working electrodes. In certain such embodiments, the electrodes 110 of the measurement system 100 can also include at least one counter electrode.

There are a number of design challenges to implementing a measurement system 100 in the compact format illustrated in FIG. 1. For example, it may not be practical to include a traditional reference electrode in the electrodes 110. In some implementations, the reference electrode of the electrodes 110 of the measurement system 100 of FIG. 1 can be embodied by a pseudo-reference electrode. As used herein, a pseudo-reference electrode may generally refer to a reference electrode that has a potential that may have a dependency on a known parameter of the system (or two or more parameters of the system in certain applications). Aspects of this disclosure relate to systems and techniques that can compensate for the dependency of a pseudo-reference electrode to provide a measurement system with desirable accuracy. At the same time, the pseudo-reference electrode can be implemented in a compact measurement system 100.

The reference electrode architectures described herein can be used in applications in which other pseudo-reference electrodes (e.g., relatively low-cost silver|silver chloride pseudo-reference electrodes (Ag|AgCl)) are not sufficiently accurate for the desired measurements. For example, Ag|AgCl pseudo-reference electrodes may have a chloride content dependency that affects the stability of the Ag|AgCl pseudo-reference electrodes. The potential of Ag|AgCl pseudo-reference electrodes may be generally stable, but will change when the chloride content of the solution changes. In some cases, the chloride sensitivity values for Ag|AgCl pseudo-reference electrodes may be greater than 50 mV/decade $Cl^-$. Some other pseudo-reference electrodes may have similar dependencies that can affect the stability of the pseudo-reference electrodes.

When used in a measurement system (such as the in-line measurement system 100 of FIG. 1) designed to measure a parameter of a known solution type, it may be possible to select a pseudo-reference electrode that has a dependency on a parameter that is unlikely to be present in the solution. However, this may be impractical or impossible for measurement systems designed to measure a plurality of different parameters, such as the in-line measurement system 100 of FIG. 1. Thus, it can be desirable to provide a reference electrode architecture that can compensate for one or more dependencies in a pseudo-reference electrode such that the pseudo-reference electrode can be used in an in-line measurement system while also providing sufficient measurement accuracy.

There are many example applications in which the reference electrode architectures described herein would be advantageous over other architectures. These applications include, for example, biosensing; industrial; water quality; etc. The reference architectures disclosed herein can be implemented in applications where a reference electrode is stored in a calibration solution or a maintenance solution. Alternatively or additionally, reference architectures disclosed herein can be implemented in applications with single or intermittent electrochemical measurements.

In some applications, the potential of the reference electrode may not change by a significant amount because the tests are relatively quick. For example, the reference electrode architecture described herein can be used in fluidic (e.g., microfluidic) systems in which the reference electrode is continuously stored in a particular 'storage solution' or 'calibrant' and the reference electrode can be exposed to the analyte or sample for short periods of time. These periods of time can range from a few seconds to minutes.

In the context of an Ag|AgCl pseudo-reference electrode, limiting the amount of time that the Ag|AgCl pseudo-reference electrode is exposed to the solution can reduce the response of the Ag|AgCl pseudo-reference electrode to chloride ions present in the solution. One example solution that Ag|AgCl pseudo-reference electrodes can be used to measure is blood. When using an Ag|AgCl pseudo-reference electrode for measurements in blood and/or other solutions, the Ag|AgCl pseudo-reference electrode may not be sufficiently stable. By using a membrane over the Ag|AgCl pseudo-reference electrode for measuring one or more parameters of blood, it can be beneficial to provide a membrane over the Ag|AgCl pseudo-reference electrode to reduce chloride dependency, thereby improving the accuracy of measurements. For measuring other solutions, it can be beneficial to provide the membrane to reduce chloride dependency and/or a different ion dependency. The membrane can reduce biofouling. Membranes can also be used to improve other parameter dependencies for different pseudo-reference electrodes. For example, the membrane for a particular pseudo-reference electrode can be configured to reduce diffusion of the dependence ion to the pseudo-reference electrode. In the context of an Ag|AgCl pseudo-reference electrode, the membrane can slow down the chloride diffusion, resulting in a slower potential change than a comparable bare Ag|AgCl pseudo-reference electrode without the membrane. In the case of a pseudo-reference electrode with chloride dependance, a chloride sensor used for compensation may comprise a bare Ag|AgCl electrode (e.g., without a membrane). In some other embodiments, the chloride sensor can comprise a chloride ion selective sensor (ISE). In some applications, the chloride ISE can comprise an electrode with an ion selective membrane (ISM) for chloride ions. Similar configurations can be used for pseudo-reference electrodes with different dependencies (e.g., a bromide sensor where the pseudo-reference electrode has a bromide dependency).

Aspects of this disclosure relate to a pseudo-reference electrode having a membrane configured to reduce the dependency of a pseudo-reference electrode. For example, a membrane can be formed over a pseudo-reference electrode (such as an Ag|AgCl pseudo-reference electrode) to slow down the ion diffusion (e.g., chloride ion diffusion) into the pseudo-reference electrode. This pseudo-reference electrode having a membrane may still have some dependance to a particular ion, but may have no or negligible dependency to other ions.

In some embodiments, the pseudo-reference electrode can include a composite such as a mix of Ag/AgCl and Ag/AgBr to reduce the chloride dependency effect. This can be used without a membrane for short term use or with membrane for long term use. In some other embodiments, the pseudo-reference electrode can be used with a membrane for short term use, where the use of the membrane can slow down diffusion and improve the efficiency of short term measurements. However, aspects of this disclosure are not limited thereto and the pseudo-reference electrode with or without the membrane can be used for any length of time in certain implementations.

According to aspects of this disclosure, the measurement system can include a pseudo-reference electrode as well as a separate dependence measurement electrode. For example, the dependence measurement electrode (also referred to as a "dependence electrode") can include a chloride electrode (e.g., AgCl, ion-selective membrane for chloride, and/or an epoxy-based chloride sensor). Epoxy-based chloride sensors can include electrodes with a well-known and stable chloride sensitivity.

The relationship (e.g., potential) between the pseudo-reference electrode and the dependence electrode can be well-defined and stable. Accordingly, using measurements from the dependence electrode, the potential of the pseudo-reference electrode can be measured and used to correct for the pseudo-reference electrode potential drift in different solutions. In embodiments using an Ag|AgCl pseudo-reference electrode, a chloride electrode can be used for the dependence electrode. By knowing the chloride electrode potential from the chloride electrode, the theoretical Ag|AgCl pseudo-reference can be easily calculated and can be used to correct for the theoretical Ag|AgCl pseudo-reference potential drifts in different solutions.

Figure 2:
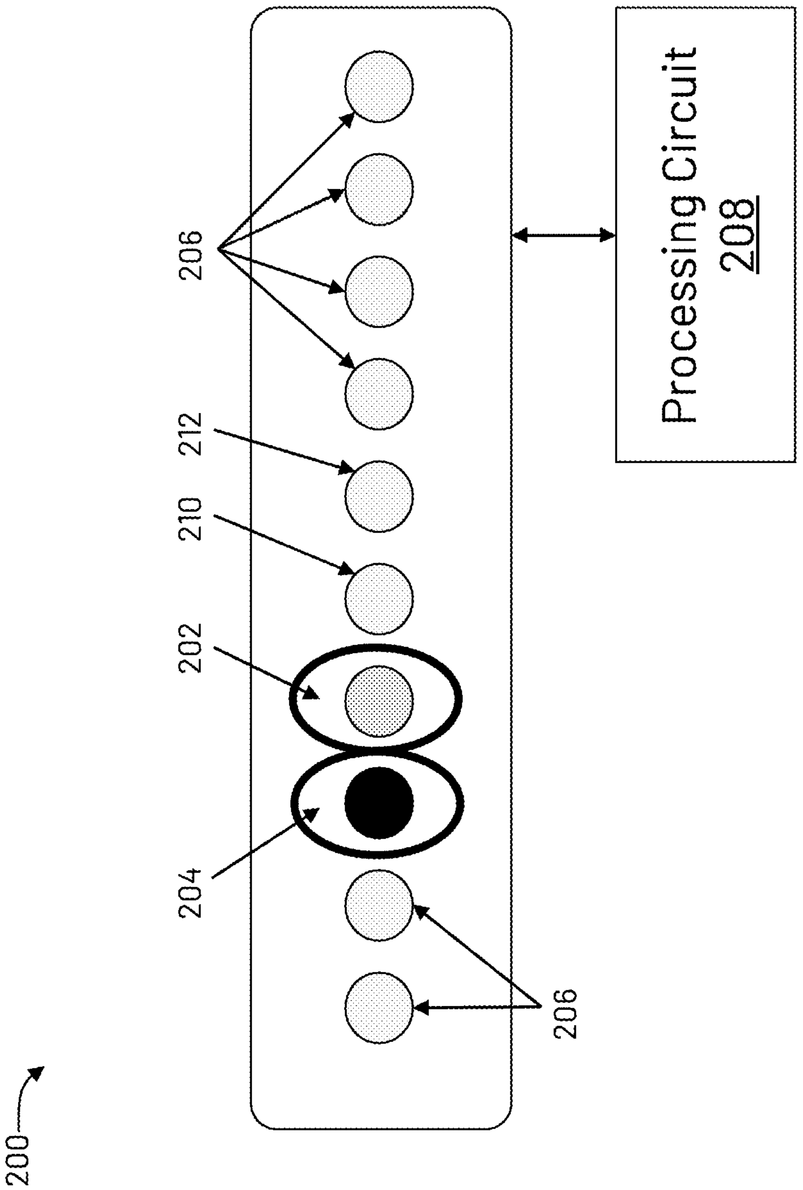
FIG. 2 is a schematic diagram of an embodiment of a measurement system having a pseudo-reference electrode and a dependence electrode in accordance with aspects of this disclosure.

FIG. 2 is a schematic diagram of an embodiment of a measurement system 200 having a pseudo-reference electrode 202 and a dependence electrode 204 in accordance with aspects of this disclosure. As shown in FIG. 2, the measurement system 200 includes a dependence electrode 204 and a pseudo-reference electrode 202. The measurement system 200 can also include one or more other electrodes 206 in some embodiments. In some embodiments, the measurement system 200 can include one or more working electrodes 210 and/or one or more counter electrodes 212. Although the pseudo-reference electrode 202, the dependence electrode 204, the other electrodes 206, the working electrode 210, and the counter electrode 212 are illustrated in a certain configuration (e.g. at certain locations within the measurement system 200), the locations of the different electrodes can be changed without departing from aspects of this disclosure.

The pseudo-reference electrode 202 may have a dependence on a parameter such that the potential of the pseudo-reference electrode 202 may not be sufficiently consistent and/or stable. For example, the pseudo-reference electrode 202 may have a dependence on one or more of the following: chloride ions, bromide ions, iodide ions, bicarbonate ions, acetate ions, lactate ions, sulfate ions, nitrate ions, potassium ions, sodium ions, temperature, pH, and/or other ions. In order to compensate for the dependence, the dependence electrode 204 can measure the parameter corresponding to the dependency of the pseudo-reference electrode 202. For example, the dependence electrode 204 can be configured to measure the concentration of chloride ions, bromide ions, iodide ions, bicarbonate ions, acetate ions, lactate ions, sulfate ions, nitrate ions, the temperature, and/or the pH of the solution.

In certain applications, two or more dependence electrodes 204 can compensate for two or more parameters that impact the reference voltage generated by a pseudo-reference electrode 202. For example, a pseudo-reference electrode 202 can generate a reference voltage that depends on chlorine ion concentration and temperature, and a first dependence electrode 204 can measure chlorine ion concentration and a second dependence electrode 204 can measure temperature. As another example, a pseudo-reference electrode 202 can generate a reference voltage that depends on chlorine ion concentration and pH, and a first dependence electrode 204 can measure chlorine ion concentration and a second dependence electrode 204 can measure pH.

Although FIG. 2 illustrates a measurement system 200 with a single pseudo-reference electrode 202, aspects of this disclosure are not limited thereto. For example, a measurement system 200 can include a plurality of different pseudo-reference electrodes 202. In some embodiments, at least two of the pseudo-reference electrodes 202 have different dependencies. In certain implementations, the measurement system 200 may be configured to select one or more of the pseudo-reference electrodes 202 for particular solutions based on a measurement of the stability of the pseudo-reference electrodes 202.

The measurement system 200 can further include a processing circuit 208 configured to compensate the reference potential of the pseudo-reference electrode 202 based on the potential of the dependence electrode 204. The processing circuit 208 can include any suitable circuitry that can perform such compensation. The processing circuit 208 can process the compensated reference voltage and a voltage from the working electrode 210 to generate a measurement of an analyte. In certain applications, the processing circuit 208 can process the compensated reference voltage and a current between the working electrode 210 and the counter electrode 212 to generate a measurement of an analyte. In certain applications, the processing circuit 208 can process a charge measurement or an impedance measurement between the working electrode and the pseudo-electrode. In some embodiments the measurement system 200 may not include a counter electrode 212, and thus the processing circuit 208 can process the compensated reference voltage and a voltage from the working electrode 210. In some other embodiments, the processing circuit 208 can compensate and process one or more other electrical parameters measured from the pseudo-reference electrode 202 and the dependence electrode 204. For example, the processing circuit 208 can process measurements of current received from the working electrode 210, and optionally, from the counter electrode 212.

In one embodiment, the dependence electrode 204 includes a chloride ion sensor and the reference voltage of the pseudo-reference electrode 202 has a chloride ion dependence. The chloride dependence of the pseudo-reference electrode 202 can be corrected (e.g., reduced or eliminated) based on one or more measurements taken using the chloride ion sensor of the dependence electrode 204.

In some embodiments, the sensor substrate material can be: polymer-based (e.g., flex technology, moulding, etc.), silicon or glass based (e.g., semiconductor materials), paper-based, etc.

In certain embodiments, the electrodes of the measurement system 200 may be stored in 'storage solution' and dipped on a sample when needed. In some embodiments, the sample may be added (dispensed, etc.) onto the electrodes. The electrodes of the measurement 200 are included in an electrochemical sensor. The measurement system 200 can output a measurement indicative of a chemical composition of the sample. The measurement can be represented by an electrical signal.

Depending on the implementation, the measurement system 200 can be part of a (micro) fluidic system, incorporating a channel to introduce the 'storage solution' or the samples of interest, etc. to the electrodes of the measurement system 200.

The pseudo-reference electrode 202 can be embodied using any suitable materials. For example, the pseudo-reference electrode 202 can include Ag, Au, AgCl, Pt, C, and/or AgBr. The pseudo-reference electrode 202 can also have a membrane formed on top of the pseudo-reference electrode 202 to reduce the magnitude of the dependency. The membrane may be imidazolium chloride-based (or other large organic cation salt with chloride), mixed in plastic matrix (PVC) with optional plasticizers, etc.

In some embodiments, the dependence electrode 204 comprises AgCl in order to detect chloride ions. For example, the dependence electrode 204 can include an epoxy-based Cl-electrode. The dependence electrode 204 can also include a chloride ion-selective membrane configured to allow chloride ions to pass therethrough and block or reduce other ions from penetrating through the chloride ion-selective membrane.

The pseudo-reference electrode 202 can be formed from one or more of: Ag, Au, AgCl, Pt, C, or AgBr. The pseudo-reference electrode 202 can further include a membrane formed over the electrode. In some embodiments, the membrane may be imidazolium chloride-based (or other large organic cation salt with chloride), mixed in plastic matrix (PVC) with optional plasticizers, etc. In further embodiments, the membrane may be polydimethylsiloxane (PDMS)-based (e.g., KCl in PDMS). In still other embodiments, the membrane may be conducting polymer-based. In one example, the pseudo-reference electrode can include a mix of AgCl with AgBr and/or AgI.

Figure 3A:
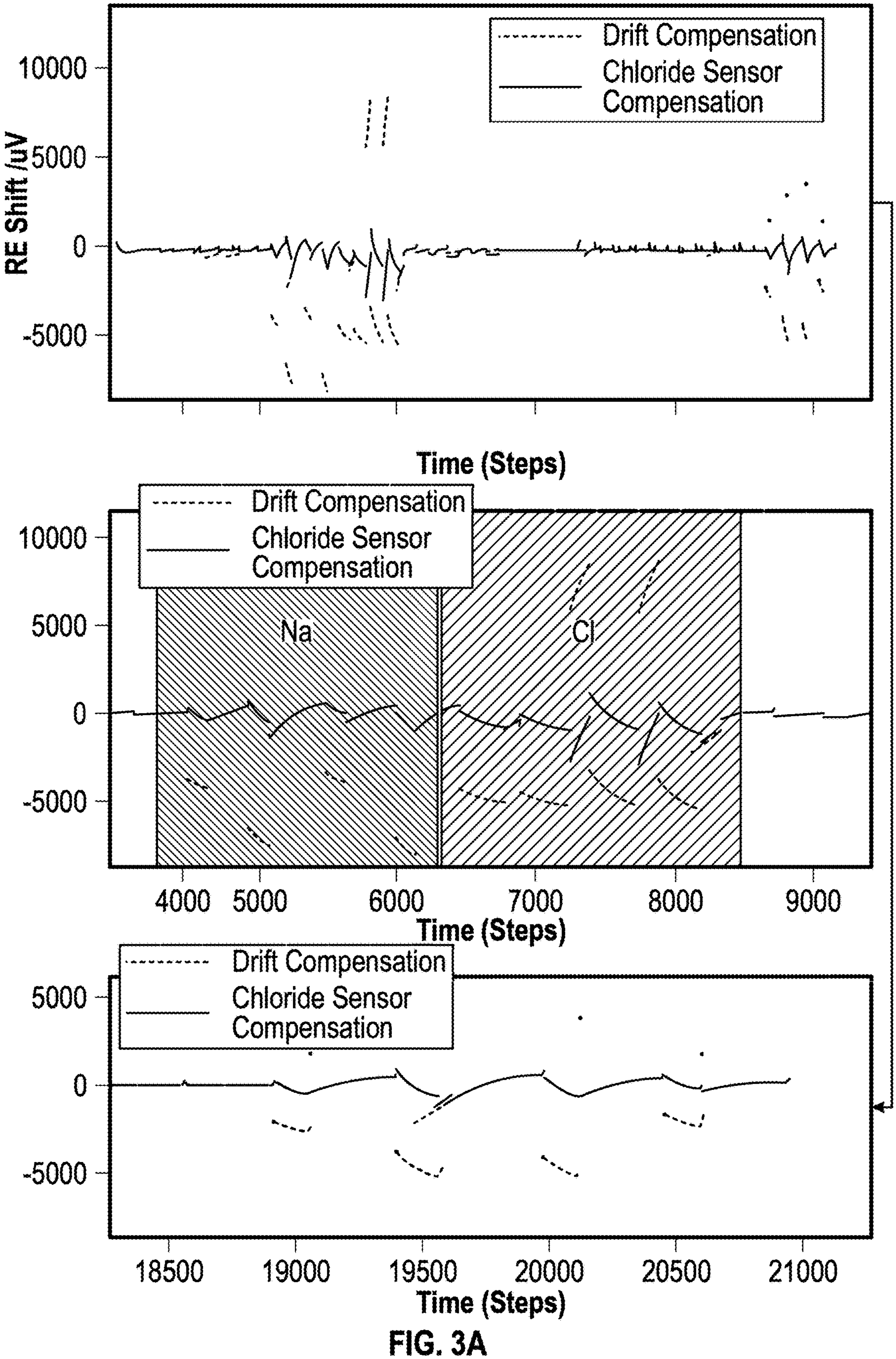
FIG. 3A includes graphs that illustrate drift compensation and chloride sensor compensation.
Figure 3B:
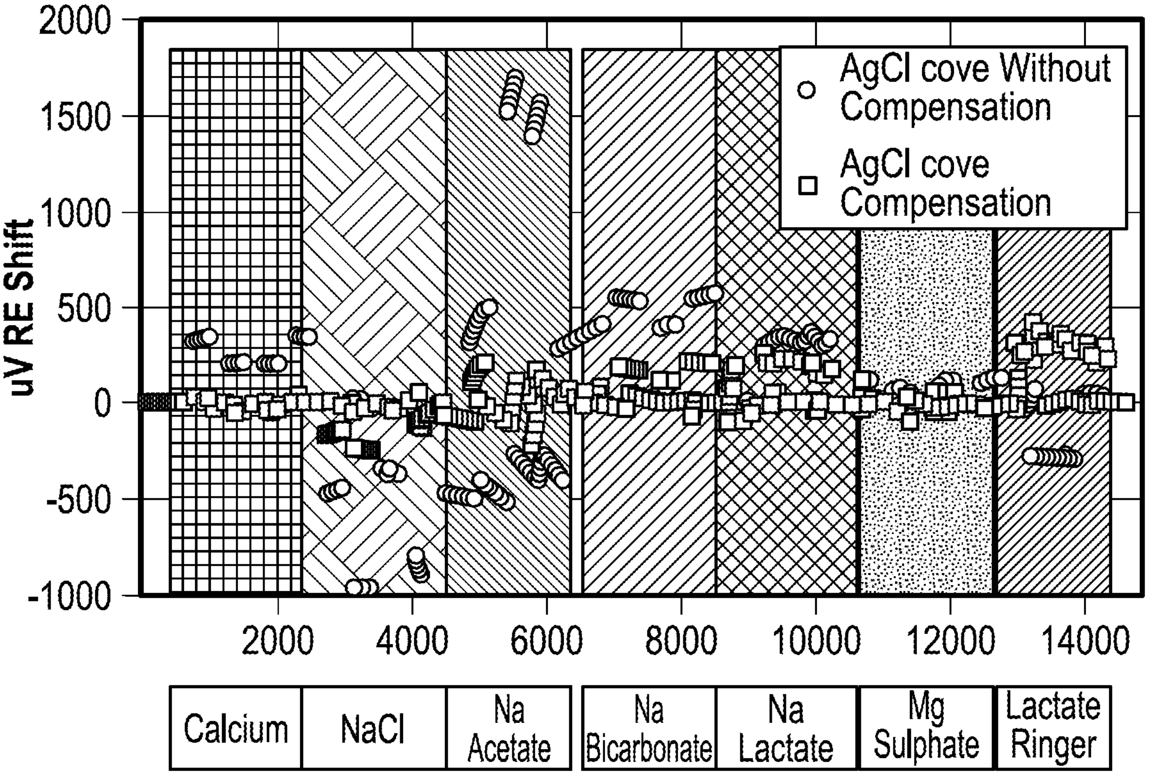
FIG. 3B illustrates the voltage of the pseudo-reference electrode with and without compensation.

FIG. 3A includes graphs that illustrate drift compensation and chloride sensor compensation. FIG. 3B illustrates the voltage of the pseudo-reference electrode with and without compensation with various interference steps namely calcium steps (0.25 mM to 1.7 mM), chloride steps (110 mM to 180 mM), acetate steps (40 mM to 90 mM), carbonate (20 mM to 40 mM), lactate (10 mM to 20 mM), sulphate (1 mM to 2 mM) and lactate ringer (25 mM to 50 mM). In FIG. 3B, the AgCl dependence sensor can be arranged on the same chip or substrate as the pseudo-reference electrode (e.g., as shown in FIGS. 1 and 2). With reference electrode compensation disclosed herein, reference voltages with within a several microvolt accuracy can be achieved.

In some embodiments, the dependence electrode 204 can include non-chlorinated anions in place of a chloride anion. The non-chlorinated anions may be more stable with the Ag/AgCl interface. Other example anions which may be used for the dependence electrode include: tris(pentafluoroethyl)trifluorophosphate (FAP), bis (trifluoromethanesulfonyl)imide (TFSI) or bis(fluorosulfonyl)imide (FSI), however, aspects of this disclosure are not limited thereto.

In certain embodiments, the dependence electrode 204 can also include one or more transduction layers, which can be planar or 3D. The transduction layer(s) can include laser induced graphene, microporous carbon, carbon nanotubes (CNTs), etc. The transduction layer(s) can also include colloid-imprinted mesoporous (CIM) carbon which can be effective with fluorosilicone and PVC matrixes on macro Au electrodes. The transduction layer(s) can further include imidazolium-based ionic liquid used with TFSI anion, which has been tested in animal serum. The transduction layer(s) can also include N-methyl-2-pyrrolidone (NMP)-based transduction layers with PVdF, which have shown compatibility as reference electrodes within blood serum. Phosphonium based ionic liquids can be used with TFSI anion. The above anions described as included in the transduction layer(s) are merely examples and aspects of this disclosure are not limited thereto. Any suitable principles and advantages of the one or more transduction layers can be applied to a pseudo-reference electrode.

In certain implementations, a reference electrode ion-selective membrane can be placed on top of an AgCl as pseudo-reference electrode 202. A chloride sensor (e.g., AgCl or chloride ion-selective electrode) can be used as a dependence electrode 204 to compensate for junction potentials due to changes in chloride concentration in the solution being measured. The reference electrode ion-selective membrane may have different compositions (with organic chloride salts, etc), or may be PDMS film with AgCl mixed in film, or other conductive polymers. Further aspects of this disclosure relate to algorithms or techniques which can be used to compensate for "drifting profiles". In some embodiments, the dependence sensor 204 can include AgBr and/or AgI since these materials may be more stable than AgCl.

In some embodiments, the use of Ag for the pseudo-reference electrode 202 can provide a larger chloride dependence/sensitivity than a similar AgCl pseudo-reference electrode 202. This can enable the measurement system to measure AgCl vs Ag, and use AgCl to compensate for Ag voltage changes.

In certain embodiments, Nafion or other proton or cation exchange membrane (for example PEDOT/PSS) can be used for the membrane over an AgCl pseudo-reference electrode 202 to reduce anion diffusion. In other embodiments, the membrane can be graphene oxide to minimize ion diffusion. Any suitable alkaline/anion exchange membrane can be implemented in certain embodiments.

In some embodiments, a pseudo-reference electrode 202 can be designed without chloride to have a minimal $Cl-$ response. However, chloride-free pseudo-reference electrode 202 may have a significant reaction to flow changes (e.g., a dependence on flow changes). One way of addressing this dependence is to laminate layers of chloride saturated and chloride free pseudo-reference.

In one example, a saturated layer can be provided at conductive electrode surface and a chloride-free layer can be provided at a liquid interface. In another example, a saturated layer can be provided a at liquid interface can reduce flow response and a chloride free layer can be provided at a conductive electrode surface can maintain a low chloride response. In still another example, a saturated layer can be provided at each of a conductive electrode and a liquid interface with a chloride-free layer in between.

In some embodiments, the pseudo-reference electrode 202 can include a halide composite reference electrode. For example, in place of AgCl, the pseudo-reference electrode 202 can include a composite of AgBr and AgI to improve the stability and exchange current density. In addition, the effect of chloride variation in the analyte can be drastically reduced in these embodiments.

In the embodiments described above, systems, sensors, and methods are described in connection with particular embodiments. It will be understood, however, that the principles and advantages of the embodiments can be used for any other systems, sensors, or methods with a need for the reference electrodes disclosed herein.

Unless the context clearly requires otherwise, throughout the description and the claims, the words "comprise," "comprising," "include," "including," and the like are to be construed in an inclusive sense, as opposed to an exclusive or exhaustive sense; that is to say, in the sense of "including, but not limited to." Additionally, the words "herein," "above," "below," and words of similar import, when used in this application, shall refer to this application as a whole and not to any particular portions of this application. Where the context permits, words in the Detailed Description using the singular or plural number may also include the plural or singular number, respectively. The words "or" in reference to a list of two or more items, is intended to cover all of the following interpretations of the word: any of the items in the list, all of the items in the list, and any combination of the items in the list. All numerical values provided herein are intended to include similar values within a measurement error.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states.

The teachings provided herein can be applied to other systems, not necessarily the systems described above. The elements and acts of the various embodiments described above can be combined to provide further embodiments. The acts of the methods discussed herein can be performed in any order as appropriate. Moreover, the acts of the methods discussed herein can be performed serially or in parallel, as appropriate.

While certain embodiments have been described, these embodiments have been presented by way of example only, and are not intended to limit the scope of the disclosure. Indeed, the novel methods and systems described herein may be embodied in a variety of other forms. Furthermore, various omissions, substitutions and changes in the form of the methods and systems described herein may be made without departing from the spirit of the disclosure. For example, while the disclosed embodiments are presented in given arrangements, alternative embodiments may perform similar functionalities with different components and/or circuit topologies, and some elements may be deleted, moved, added, subdivided, combined, and/or modified. Each of these elements may be implemented in a variety of different ways as suitable. Any suitable combination of the elements and acts of the various embodiments described above can be combined to provide further embodiments. The accompanying claims and their equivalents are intended to cover such forms or modifications as would fall within the scope and spirit of the disclosure. Accordingly, the scope of the present inventions is defined by reference to the claims.

What is claimed is:

1. A measurement system, comprising:

a pseudo-reference electrode configured to provide a reference potential;

a dependence electrode configured to generate a dependence potential when exposed to a sample, wherein both the reference potential and the dependence potential vary based on a property of the sample, and wherein an electrochemical sensor comprises the pseudo-reference electrode and the dependence electrode; and a processing circuit configured to compensate for (i) a dependency in the reference potential based on the dependence potential and (ii) a junction potential due to the variation in the property of the sample, the dependency in the reference potential resulting in a variation of the reference potential in response to a variation in the property of the sample.

2. The measurement system of claim 1, wherein the processing circuit is further configured to control a bias potential between a working electrode and the pseudo-reference electrode.

3. The measurement system of claim 1, further comprising:

a counter electrode; and at least one working electrode, wherein the measurement system is configured to measure a parameter of the sample based on at least one of (i) a measurement potential between the working electrode and the pseudo-reference electrode, (ii) a current measurement between the working electrode and the counter electrode, (iii) a charge measurement between the working electrode and the counter electrode, or (iv) an impedance measurement between the working electrode and the counter electrode.

4. The measurement system of claim 3, wherein the at least one working electrode comprises a plurality of working electrodes, and wherein the plurality of working electrodes, the counter electrode, the pseudo-reference electrode, and the dependence electrode are arranged in-line.

5. The measurement system of claim 1, wherein the pseudo-reference electrode has a chloride ion dependence, and wherein the dependence electrode is sensitive to chloride ions.

6. The measurement system of claim 1, wherein the pseudo-reference electrode has a dependence on one or more of the following: chloride ions, bromine ions, iodine ions, bicarbonate ions, acetate ions, lactate ions, sulfate ions, nitrate ions, potassium ion, sodium ions, temperature, or pH.

7. The measurement system of claim 1, wherein the pseudo-reference electrode comprises one or more of: Ag, Au, AgCl, Pt, C, and/or AgBr.

8. The measurement system of claim 1, further comprising a membrane formed over the pseudo-reference electrode.

9. The measurement system of claim 8, wherein the membrane is a chloride-diffusion restriction membrane, wherein the dependence electrode is a chloride electrode, and wherein the property is chloride concentration.

10. The measurement system of claim 1, further comprising a membrane formed over the dependence electrode.

11. The measurement system of claim 1, wherein the pseudo-reference electrode is stored in a calibration solution.

12. The measurement system of claim 11, wherein the dependence electrode is stored in the calibration solution.

13. The measurement system of claim 1, further comprising a second dependence electrode configured to generate a second dependence potential when exposed to the sample, wherein both the reference potential and the second dependence potential vary based on a second property of the sample.

14. A measurement method, comprising:

obtaining a measurement from a dependence electrode that is exposed to a sample; and compensating for (i) a dependency in a reference potential generated by a pseudo-reference electrode based on the measurement and (ii) a junction potential due to the variation in the property of the sample, wherein an electrochemical sensor comprises the dependence electrode and the pseudo-reference electrode, the dependency in the reference potential resulting in a variation of the reference potential in response to a variation in a property of the sample.

15. The measurement method of claim 14, further comprising generating a measurement of the property of the sample based at least partly on a compensated reference potential generated by the compensating.

16. The measurement method of claim 14, further comprising:

measuring a parameter of the sample based on at least one of (i) a measurement potential between a working electrode and the pseudo-reference electrode, (ii) a current measurement between the working electrode and a counter electrode, (iii) a charge measurement between the working electrode and the counter electrode, or (iv) an impedance measurement between the working electrode and the counter electrode.

17. The measurement method of claim 14, further comprising:

obtaining a second measurement from a second dependence electrode that is exposed to the sample; and compensating for a second dependency in the reference potential generated by the pseudo-reference electrode based on the second measurement.

18. A measurement system, comprising:

means for providing a reference potential;

means for generating a dependence potential when exposed to a sample, wherein both the reference potential and the dependence potential vary based on a property of the sample, and wherein an electrochemical sensor comprises the means for providing the reference potential and the means for generating the dependence potential;

means for compensating for a dependency in the reference potential based on the dependence potential and a junction potential between the sample and a calibration solution due to the variation in the property of the sample, the dependency in the reference potential resulting in a variation of the reference potential in response to a variation in the property of the sample.

19. The measurement system of claim 11, wherein the junction potential is between the sample and the calibration solution.

* * * * *